May 26, 1970 — W. C. LANE — 3,513,904

SELF-PRESSURIZING FEEDER HEAD DEVICE

Filed Oct. 26, 1967 — 4 Sheets-Sheet 1

INVENTOR.
WYMAN C. LANE
BY Jerome R. Cox
ATTORNEY

May 26, 1970     W. C. LANE     3,513,904

SELF-PRESSURIZING FEEDER HEAD DEVICE

Filed Oct. 26, 1967     4 Sheets-Sheet 2

INVENTOR.
WYMAN C. LANE
BY
Jerome R. Cox
ATTORNEY

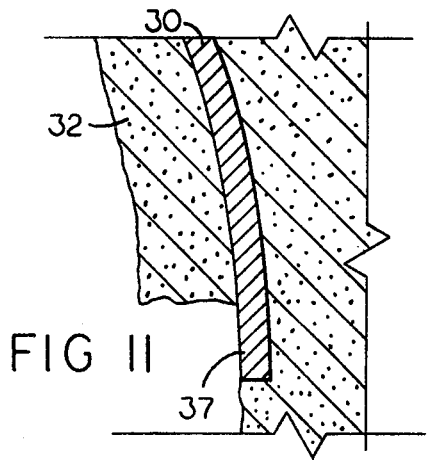
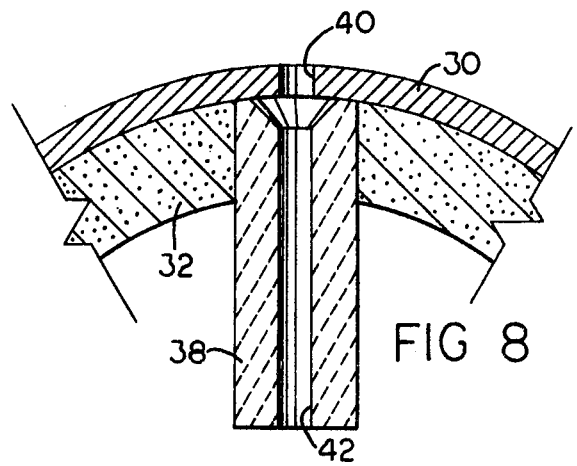
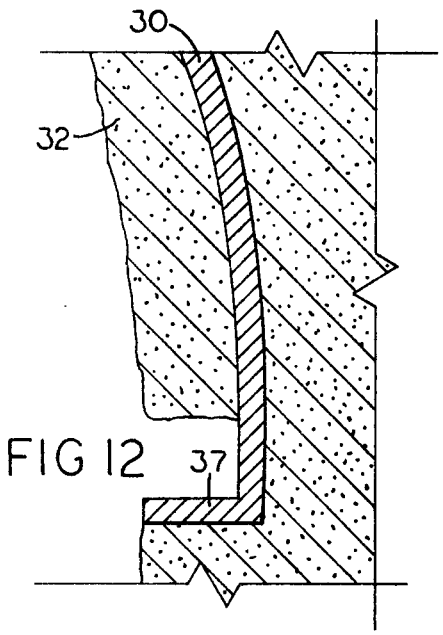
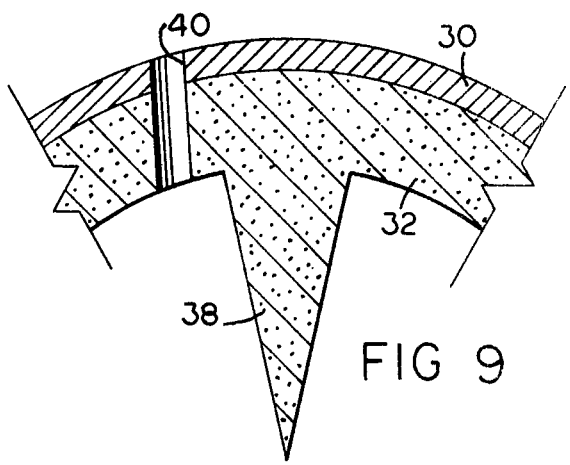
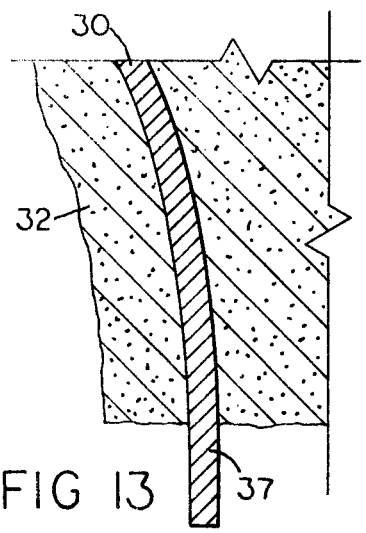
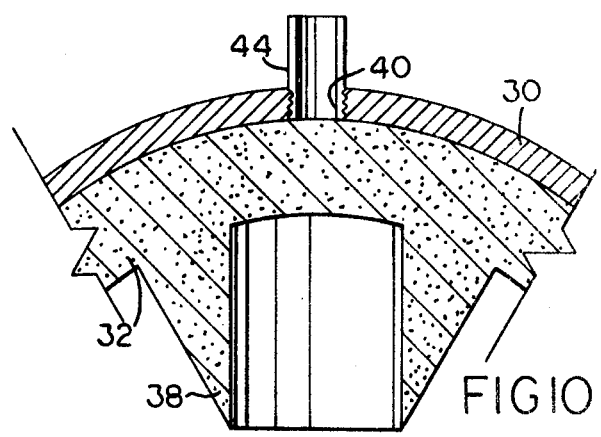

May 26, 1970 W. C. LANE 3,513,904
SELF-PRESSURIZING FEEDER HEAD DEVICE
Filed Oct. 26, 1967 4 Sheets-Sheet 4

INVENTOR.
WYMAN C. LANE
BY Jerome R. Cox
ATTORNEY

United States Patent Office 3,513,904
Patented May 26, 1970

3,513,904
SELF-PRESSURIZING FEEDER HEAD DEVICE
Wyman Curtis Lane, 4131 Edgehill Drive,
Columbus, Ohio 43220
Filed Oct. 26, 1967, Ser. No. 678,231
Int. Cl. B22c 9/02; B22d 27/14
U.S. Cl. 164—356          28 Claims

ABSTRACT OF THE DISCLOSURE

A self-pressurizing feeder head vessel for pressure feeding molten metal into a casting mold is described. The feeder head vessel shown is a dome-shaped, fluid impervious shell with an open bottom, the shell being lined with green sand to define a feeder head cavity.

A porous cylinder or an apertured tube is provided at the top of the vessel so that steam formed by heat in the green sand may flow through the cylinder or tube and downward into the feeder head cavity and thus apply pressure on the molten metal in the feeder head cavity to force additional molten metal into the casting mold during the shrinking period.

Thus a method disclosed for applying pressure to the molten metal in the feeder head cavity is to vaporize the water in the green sand and apply the fluid pressure thereby generated to the molten metal, and thereby force the molten metal under pressure into the casting mold during shrinkage.

BACKGROUND OF THE INVENTION

My invention relates to casting, and more particularly relates to the efficient production of sound castings using pressurized feeder heads.

Foundrymen have long known that sounder castings may be produced by feeding molten metal or other molten substances, herein referred to as melt, from one or more chambers into a casting as it cools. These chambers, called feeder head cavities, are usually located near the portion of the casting being fed, are in fluid communication with the casting mold, and serve to compensate for shrinkage of the melt as it solidifies and cools in the casting mold. The metal within the feeder head cavity is called a feeder head, although it is often called a riser, a blind riser, or a shrink bob. Usually a feeder head is cylindrical or dome shaped as determined by the shape of the feeder head cavity.

When casting with feeder heads, melt enters the feeder head cavity and a solidified layer chills around the outer surface of the feeder head, the necessary runners and the casting itself positioned in the adjacent casting mold. The solidified layer is airtight and, therefore, unless other provision is made, only the force of gravity on the liquid portion of the feeder head, called the feeding reservoir, will cause feeding of the melt toward the casting.

J. Williams in U.S. Pat. 2,205,327, and F. J. Mackett, Jr. in U.S. Pat. 2,295,227, point out some of the difficulties of using unvented feeder heads. Williams describes means for venting the feeder head cavity to the atmosphere so that atmospheric pressure may additionally be applied to feed melt to the casting. Williams uses a porous rod extending from a point, in communication with the atmosphere, to a point within the feeder head cavity. Mackett burns a combustible rod in the riser portion of his apparatus.

Because the application of a superatmospheric pressure to a feeder head allows the use of smaller feeder heads and therefore leads to more efficiency, two systems for applying such pressure were devised.

One system utilizes superatmospheric gas pressure applied to the feeder head from an external gas source (e.g. a source of air pressure). This system is typified by the U.S. patents to Ling 2,561,062 and to Billiar 2,568,428, and by the British patent to Metropolitan Vickers 676,571. However, these systems require bulky and expensive gas containers, hoses, regulators, and gages, and require extensive manual observation and control.

The other system is typified by the U.S. patents to Campbell et al. 2,439,450 and to Hardy 2,476,296. Hardy provides a volatizable metal supported within the feeder head cavity. Other patentees use an encapsulated gas producing substance or a material which expands on ignition to create a pressure on the feeder head. However, these prior types do not provide a sufficient or controllable time delay for formation of a solidified layer of metal at the exterior of the feeder head to contain the gas produced. These prior types also do not allow a satisfactory rate of pressure increase. Breaks in their solidified layer around the feeder head result in an immediate loss of gas pressure. The capsule materials used by some of these patentees add foreign materials to the feeder head ruining its scrap value.

When pressure casting with feeder heads, a proper time delay before pressurization followed by a proper rate of increase of pressure on the feeder head is necessary to permit the solidification of a sufficiently thick solidified layer around the exterior of the feeder head, the casting and the runners. The solidified layer in the casting and runners must be sufficiently thick at all times to contain the pressure being applied. Too much initial pressure may burst the solidified layer and result in a leak of molten metal through the solidified layer. A sand penetration type defect on the surface of the casting will result. However, as the cast article cools and the solidified layer thickens, an increase in pressure is desirable to adequately feed the melt to the casting to compensate for shrinkage in the casting and to make it sound.

There is therefore a need for a feeding system which will provide controlled time delay between the introduction of the melt into the feeder head cavity and the development of pressure. This time delay allows a sufficiently thick solidified layer to chill around the exterior of the runners and the casting to contain the applied pressure.

There is a need for a feeding system which will provide a controllable, initially small, and smoothly increasing gas pressure to a feeder head, with a time delay between the pouring of the liquid metal and the initial development of such pressure.

Objects

It is therefore an object of my invention to provide an improved pressure feeding system for use in the production of castings.

Another object of my invention is to provide a pressure feeding apparatus for castings and a method which avoids an uncontrollable, premature burst of the solidified layer and loss of pressure, but rather provides a time delay between the introduction of melt into the feeder head cavity and the development of pressure.

Another object of my invention is to provide for a method of casting with which a low controllable fluid pressure is applied initially to a feeder head and in which the fluid pressure is smoothly and controllably increased so that the end result is a casting with a minimum of defects.

A still further object of my invention is to provide a feeding apparatus and method for casting wherein an initially steadily increasing fluid pressure is applied to the feeder head without loss of pressure in the time period before a solidified layer of sufficient strength and thickness to hold such pressure chills around the feeder head.

A still further object of my invention is to provide a feeding apparatus for castings which does not require complex or expensive equipment, which can easily be handled by the ordinary foundry worker, and which can be re-used; and to provide a feeding method which is controllable, simple, and easily performed.

Further objects and features of my invention will be apparent from the following specification and claims when considered in connection with the accompanying drawings illustrating several embodiments of my invention.

SUMMARY OF THE INVENTION

I have found that these and other objects may be attained in a device for use in conjunction with a feeder head cavity and with a temperature-responsive fluid pressure producing agent in the supplying of melt to a casting mold, the device comprising: a substantially fluid impervious shell having, in a selected position, an open bottom to permit entry of melt into the cavity, said shell adapted to receive a refractory inner lining for containing said agent.

More particularly, such objects may be attained if the device is provided with a fluid conducting shaft extending into the cavity from the refractory to provide for fluid communication between the cavity and the refractory.

More particularly, these objects may be attained in a device for use in conjunction with a feeder head cavity in the supplying of melt into a connected casting mold, the device comprising a substantially fluid impervious shell having, in a selected position, an open bottom to permit entry of melt into the cavity; a refractory inner lining in at least a portion of the shell; and a heat-responsive fluid pressure-producing agent contained by the refractory; wherein fluid pressure is generated by heat transfer to the agent, and the pressure is directed toward the supplying of melt toward the casting mold.

I have further found that these objects may be attained substantially automatically by a method for applying desirable pressure comprising the steps of (a) vaporizing the water in green sand; and (b) effecting the application of the vapor pressure to the feeder head.

These objects may be attained in a feeder head device having its fluid pressure producing agent positioned entirely outside of the feeder head cavity but in thermal connection to the feeder head.

BRIEF DESCRIPTION OF THE DRAWINGS

FIG. 8 is a view in vertical section showing details of a vent and fluid conducting shaft for use in an embodiment of my invention;

FIG. 9 is a view in vertical section of an alternative vent and fluid conducting shaft for use in an embodiment of my invention;

FIG. 10 is a view in vertical section of an alternative vent and fluid conducting shaft for use in an embodiment of my invention;

FIG. 11 is a view in vertical section showing details of a chill seal for use in an embodiment of my invention;

FIG. 12 is a view in vertical section showing details of an alternative chill seal for use in an embodiment of my invention;

FIG. 13 is a view in vertical section showing details of an alternative chill seal for use in an embodiment of my invention;

Figure 1:
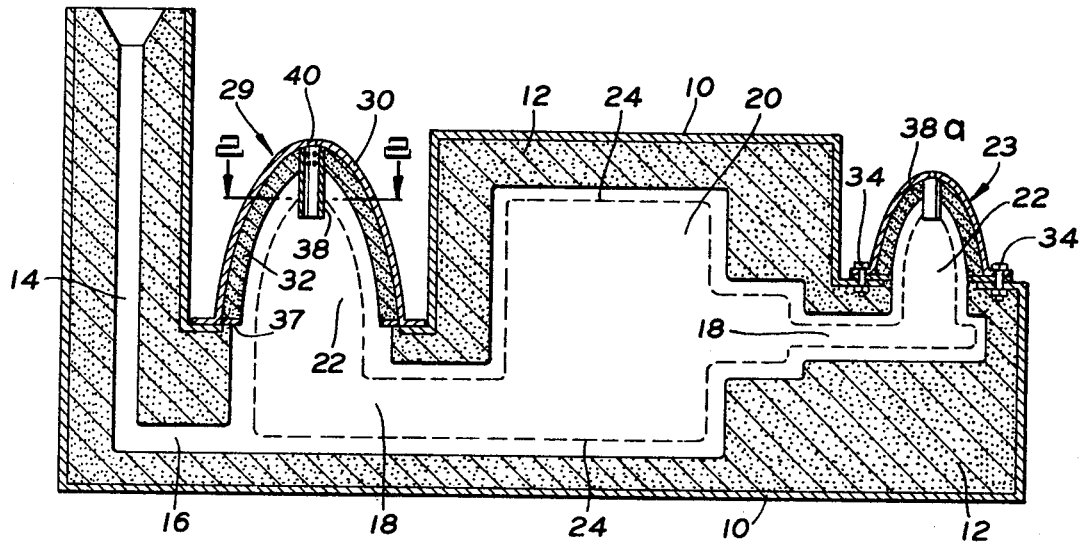
FIG. 1 is a view in vertical section of a casting apparatus equipped with a casting mold cavity and feeder head vessel devices, all constructed according to my invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

Structure

A casting apparatus as shown in FIG. 1 comrises a flask 10 containing compacted sand 12. The sand is shaped by conventional means to provide cavities which form a sprue 14 for the introduction of melt, a runner 16 connected to the sprue 14, and runners 18 connecting a casting mold cavity 20 to feeder head cavities 22 formed in feeder head vessels 23 and 29. The dashed line 24, conformably within these cavities, generally indicates the inner limits of a solidified layer which forms during the casting process around the exterior of the melt in the cavities.

Figure 2:
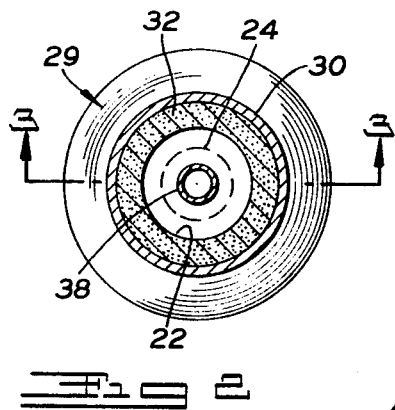
FIG. 2 is a view in horizontal section of one of the feeder head vessel devices shown in FIG. 1, and is taken substantially along the line 2—2 of FIG. 1.
Figure 3:
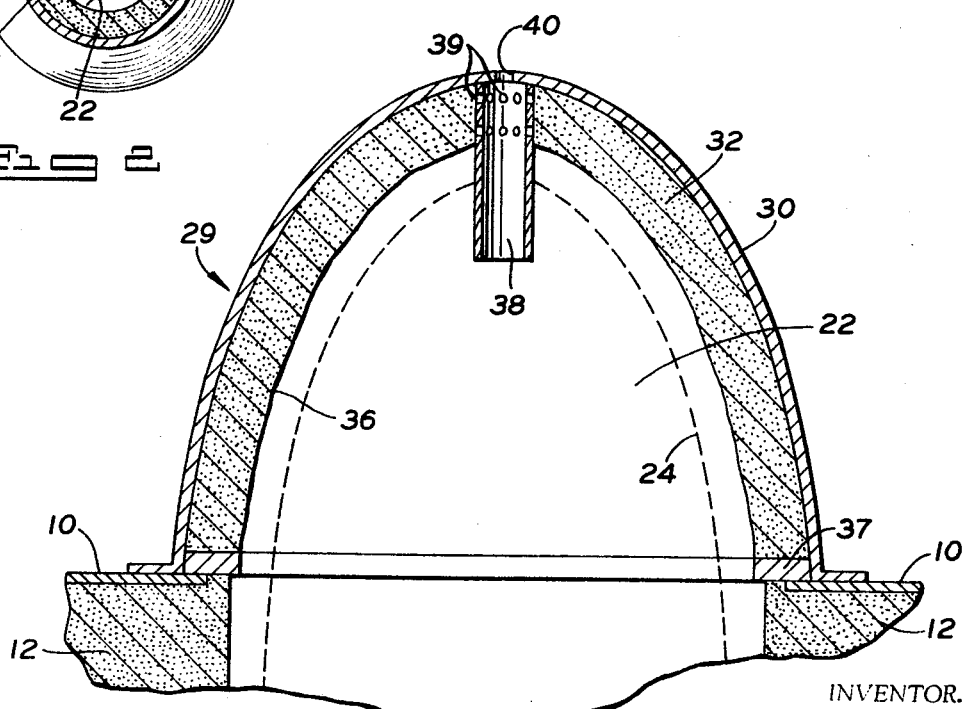
FIG. 3 is a view in vertical section of a feeder head vessel device constructed according to my invention, taken substantially along the line 3—3 of FIG. 2 but shown on an enlarged scale.

One of the feeder head vessel devices constituting a preferred embodiment of my invention is shown in greater detail in FIG. 2 and FIG. 3. The feeder head vessel, indicated generally by 29, comprises a substantially fluid impervious shell 30 with an open bottom and a refractory 32 which lines the inside of the shell 30 and which, in the embodiment I prefer, is green sand and has distributed within it a fluid pressure producing agent to be described more fully later. I prefer that the shell 30, as well as the refractory 32 lining it, be dome shaped. However, the exact shape of the shell 30 is not critical, and many other shell shapes could be used. For example, I have illustrated a box-shaped shell 30 and refractory 32 in FIG. 6. The shell 30 may be bolted, by bolts such as 34, to a portion of the flask, but this is unnecessary for ordinary applications of my invention.

The shell 30 must be substantially fluid impervious. It must be able to retain fluid under a pressure which is sufficient to properly pressurize a feeder head in the manner described below. The shell 30 may be provided with a vent 40 to permit the air, displaced by the rising melt level during pouring, to escape from the feeder head cavity 22. Such a vent must chill closed soon after the melt contacts it or be provided with some other sealing means. Alternative vent structures are described later.

The refractory 32 is positioned conformably within (i.e., lines) the shell 30. The innermost surface of the refractory forms a boundary 36 of the feeder head cavity 22. Although the boundary need not necessarily be shaped similarly to the shell 30, it must define a feeder head cavity within the shell. I prefer that the refractory 32 be in contact with the shell 30. However, another material could be interposed between the refractory 32 and the shell 30. For example, some types of fluid pressure-producing agents could be so interposed rather than being distributed within the refractory.

For the refractory 32, I prefer sand, especially green sand. Other materials such as porous ceramic would work in an equivalent manner. I use the word refractory to indicate any material which may be formed in the desired shape within a shell 30, which can withstand the temperature of the melt, and which will not substantially deteriorate or produce a substantial reaction when melt is poured into the feeder head cavity. Some materials might be satisfactory as a refractory for certain low temperature melts while not being satisfactory for higher temperature melts. In the preferred embodiment, the sand refractory is porous and permeable so that a fluid pressure-producing agent may be distributed with it and so that fluids may pass through it.

A fluid conducting shaft 38, near the top of the feeder head vessel extends from within the refractory 32 down into the feeder head cavity 22. I prefer a porous rod conducting shaft such as 38a shown in the smaller feeder head vessel device 23 in FIG. 1. Other structures, such as a thin cross section extension of the refractory or a hollow tube (shown in vertical section in FIG. 1 and FIG. 3 and in horizontal section in FIG. 2), would be substantially equivalent. The hollow tube 38, as shown, is formed at its upper end with apertures 39.

In order to provide a fluid pressure seal between the shell and the solidified layer in the casting, a chill ring 37 (see FIG. 3) may be positioned around the lower edge of the shell 30. Alternative chill seal structures are described later.

Figure 4:
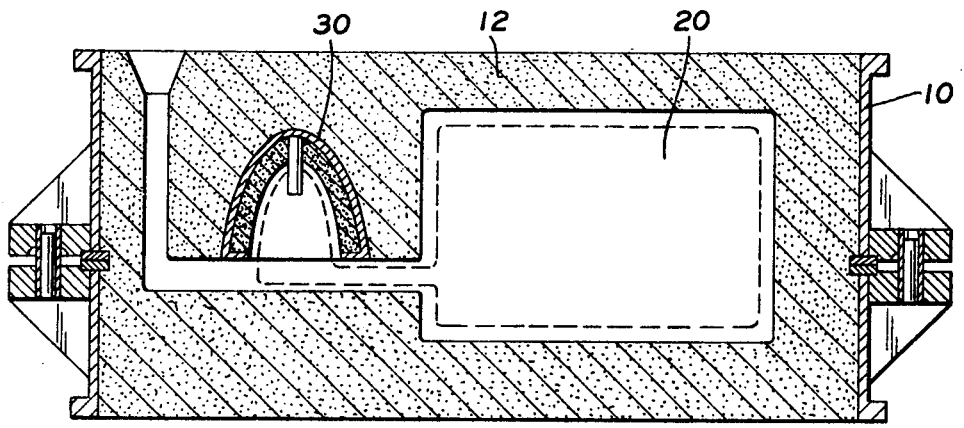
FIG. 4 is a view in vertical section of another embodiment of my invention.

In FIG. 4, I show an embodiment similar to that shown in FIG. 1 except that the feeder head vessel device is shown positioned in a conventional flask 10 and is buried within the sand 12, unexposed and inaccessible.

Figure 5:
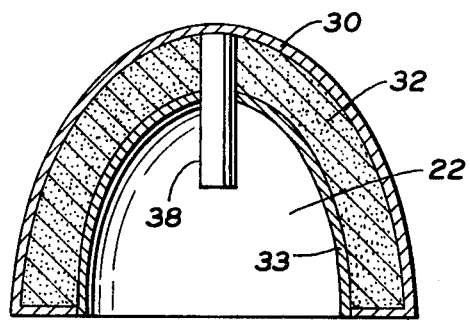
FIG. 5 is a view in vertical section of another embodiment of the feeder head vessel device of my invention.

The embodiment of FIG. 5 is substantially equivalent to the embodiment shown in FIG. 3. In addition to the structure shown in FIG. 3, an inner liner 33 is provided which separates the feeder head cavity 22 from the refractory 32. Thermally, however, the inner liner 33 is substantially an extension of the feeder head and therefore considered to be within the feeder head cavity and equivalent to the outermost layer of the feeder head itself.

Figure 6:
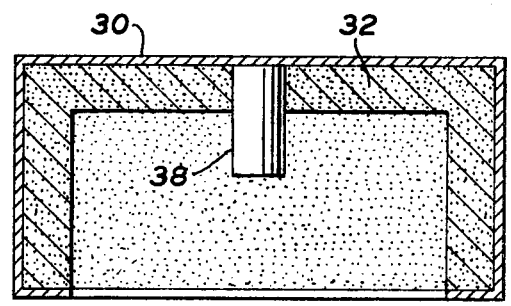
FIG. 6 is a view in vertical section of another embodiment of my invention.

In FIG. 6, there is shown an alternative embodiment in which the shell, the feeder head cavity, and the feeder head are all box-shaped or rectangular in cross section.

Figure 7:
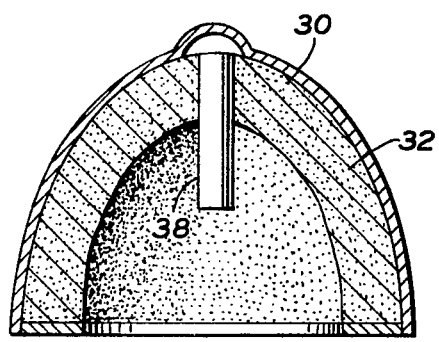
FIG. 7 is a view in vertical section of another embodiment of my invention.

Another alternative embodiment is shown in FIG. 7 in which the fluid impervious shell 30 is lined with a non-porous refractory 32 such as a glazed ceramic. A fluid pressure producing agent is interposed along the interface 35 between the shell 30 and the refractory 32.

Other alternative embodiments, which are not shown, can have refractory only partly lining shell 30. Only the upper half or only one side, for example, could be so lined with refractory.

I have found it desirable to vent the feeder head cavity to the atmosphere during the entry of melt into the feeder head cavity as stated above.

In FIGS. 8, 9, and 10, I show some example vents 40 which are each formed by a hole in the fluid impervious shell 30.

I prefer that the vent be located near the top of the shell 30, and in FIG. 8 I show a vent 40 which has a fluid conducting shaft 38 positioned below it. The fluid conducting shaft 38 shown is porous for providing fluid communication between the refractory 32 and the feeder head cavity. The shaft 38 is also provided with a passageway 42 providing communication between the feeder head cavity and the vent 40.

In FIG. 9, I show an alternative vent 40 and an alternative fluid conducting shaft 38. The vent 40 is a hole through the shell 30 and the refractory 32. Thus it is not necessary that the vent be above the fluid conducting shaft.

The fluid conducting shaft 38, shown in FIG. 9, is a conical protrusion of the same refractory material as that which lines the fluid impervious shell 30. That is, refractory is compacted into a solid cone shape to form a fluid conducting shaft 38. This cone is fixed to the refractory 32 which lines the shell 30. Alternatively, the cone and the refractory lining may be simultaneously molded.

The alternative fluid conducting shaft shown in FIG. 10 is a hollow cylinder with tapered walls and is formed of the same refractory as that lining the shell 30. The vent 40 is a pipe 44 threadedly engaged to the shell 30 to provide fluid communication between the feeder head cavity and the atmosphere through the refractory 32. The pipe 44 is provided with a hand operated or automatic valve (not shown).

In FIGS. 11, 12, and 13, I show alternative chill ring structures. In each of these embodiments, the chill ring 37 is an extension of the shell 30 and surrounds the feeder head cavity. The chill ring serves to assure rapid freezing of melt to provide a fluid pressure seal between the shell 30 and solidified layer which freezes around the exterior of the casting and the runners.

Operation

Prior to the introduction of melt into the sand mold shown in FIG. 1, the entire mold is at room temperature (e.g. 20° C.). Melt is poured into the inlet sprue 14 until all cavities are substantially occupied by melt, including the cavity which is the feeder head cavity 22. Air escapes from the feeder head cavity through the vent 40. When melt enters the vent 40 and contacts the shell 30, it will freeze to form a plug in the vent. The contact of the melt, forming the feeder head, with the boundary 36 of the feeder head cavity causes the water in the green sand refractory 32 near the boundary 36 to vaporize. This vapor diffuses outwardly away from the boundary 36 and toward the shell 32. The vapor will initially condense at a point between the boundary 36 and the shell 30 at which the green sand temperature is less than or equal to 100° C. As a result of the changing temperature gradient across the refractory, the condensation point moves outwardly toward the shell while increasing the water concentration at that point in the refractory. Thus the introduction of melt into the feeder head cavity creates a water saturated envelope surrounding the feeder head which migrates away from the feeder head, within the refractory 32, toward the shell 30.

Eventually the migrating water envelope contacts the shell and is heated to the boiling temperature. Steam is produced and the pressure starts to rise. This steam diffuses outwardly into the green sand. The diffusion of this steam provides the desired initial low pressure. The steam is forced into the shaft 38 through the pores of the shaft. Pressure is exerted on the feeder head through the fluid conducting shaft 38. As more heat is transferred to the device, its temperature rises and the pressure on the feeder head increases.

The resulting pressure and its variation in time for any given structure can be determined easily. However, it can be regulated by the initial water content of the refractory, the geometry of the refractory, and the density and heat conductivity of the refractory. Other important parameters are the melting temperature of the metal being poured and the heat of fusion of the metal. A very detailed analysis of all the controlling parameters would include much more than this simple example, but it must be emphasized that the concept would not change.

The time delay, during which no pressure is applied, is sufficient to allow the necessary solidified layer 24 to chill around the exterior of the melt. It is essential that a solidified layer be chilled and form around the runners and in the casting. However, it is clearly not necessary that a solidified layer be formed on the exterior of the feeder head because the shell 30 fully contains the pressure on the feeder head.

Figure 14:
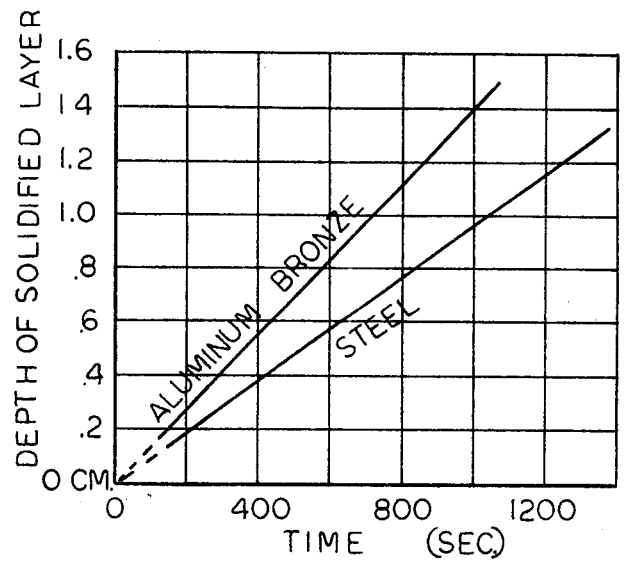
FIG. 14 is a plot of solidified layer depth as a function of time.

A suitable time for initial pressurization is chosen on a basis of the metal being poured, the depth of solidified skin desired in the casting before pressurization, and the heat transfer characteristics of the molding sand. FIG. 14 shows the theoretical time lapse required for mild steel and aluminum bronze castings plotted against the depth of solidified skin. The slope of these curves will vary slightly with the heat transfer characteristics of the molding sand. These curves are based on an average foundry molding sand.

It should be remembered that the data given in this description is merely the currently best analysis available. The data is given for purposes of illustration, and I do not intend to represent that it is accurate. It has not yet been experimentally verified and therefore is subject to modification.

The thickness of the refractory layer required to give the proper time delay is dependent on the metal poured, and the heat transfer characteristics at the refractory layer, assuming, for simplifying the analysis, that the solidified layer in the feeder head at initial pressurization is the same as in the casting.

Figure 15:
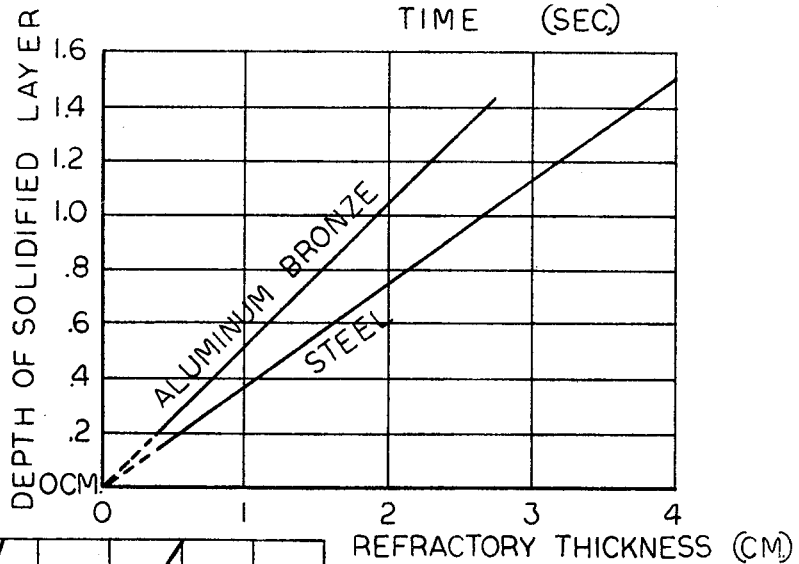
FIG. 15 is a plot of solidified layer depth as a function of refractory thickness.

FIG. 15 shows a plot of the refractory layer thickness as a function of the solidified layer thickness for mild steel and aluminum bronze. The curves are based on sand as the refractory material used in the device. Here again the curves are derived theoretically and will change slightly with sand and molding practice.

The total end pressure achieved in the casting is controlled, for a given head geometry and refractory thickness, by the final mean temperature of the water vapor in the pressurized head and the amount of water originally added to the refractory. A reasonable estimate for the means gas temperature is one-half the melting temperature on the absolute scale.

Figure 16:
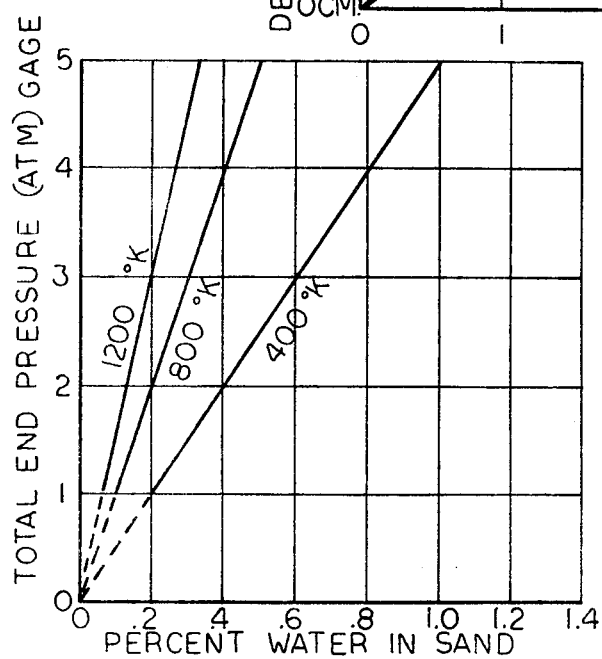
FIG. 16 is a plot of total end pressure as a function of water percentage in the sand refractory.

FIG. 16 is a plot of the percent water in the refractory versus end pressure for several mean gas temperatures. This plot was made for a cylindrical shaped feeder head 12 cm. in diameter by 30 cm. long with a refractory thickness of 0.793 cm. and a frozen layer thickness of 0.3 cm. in the head and in the casting.

The development of pressure will not normally cause the feeder head vessel to separate from the runners and casting because at all times the strength of the solidified layer, surrounding the casting and runners and frozen to the chill ring, will be sufficient to secure the feeder head vessel to the solidified layer. If, however, a break would occur in the solidified layer, melt would fill the break and reseal it. The only resulting defect will be a slight sand penetration which can be removed.

Fluid pressure-producing agents other than water can be used. Many such agents involve a vaporizable substance proceeding through physical changes analogous to the behavior of water. In fact, any vaporizable material with a vaporization temperature below the melt temperature would produce some results according to my invention. For example, powdered zinc could be distributed throughout the refractory to provide a useful pressure on the feeder head and to obtain a different time delay. Alternatively, as a further example, clay or other material containing water of crystallization would give desirable results.

It should also be apparent that it would not be necessary that all the heat which causes the fluid pressure be derived from the melt. Auxiliary heating means, such as burners or heating coils, could be attached to my device to provide heat for vaporizing the water in the green sand.

Similarly, solid or liquid chemical materials which, upon being heated, evolve a gas, can be used as fluid pressure producing agents.

With the embodiment shown in FIG. 7, a non-porous refractory 32 could be provided. The fluid-producing agent could be interposed between the refractory 32 and the shell 30. Heat conduction through the refractory would provide a time delay. The gas produced would diffuse along the interface between the refractory and the shell to the top of the shell and then through the fluid conducting shaft 38.

Another alternative mode of operating my invention would involve a device similar to that shown in FIG. 5 wherein the refractory 32 and the fluid pressure-producing agent comprises a liquid with a high thermal expansion, such as salt flux. Upon transfer of heat to the liquid flux, the flux would expand and a portion of it would pass through a fluid conducting shaft 38 such as that shown in FIG. 3, and apply its fluid pressure to the feeding reservoir.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. A device for mounting in fluid communication with a feeder head cavity and for containing pressure from a temperature-responsive fluid pressure-producing agent and used in the supplying of melt to a casting mold, said device comprising:
   a substantially fluid impervious shell having, in a selected position, an open bottom to permit entry of melt into the cavity, a refractory inner lining in said shell containing said agent and said shell having a chill seal means around its open bottom for sealingly contacting the melt and providing a gas impervious seal between the shell and the melt.

2. A device according to claim 1
   wherein a fluid conducting shaft extends from the refractory to provide for fluid communication between said cavity and said refractory.

3. A device according to claim 1
   wherein the shell has a vent therein to allow the escape of air from the feeder head cavity during the entrance of melt therein.

4. A device according to claim 1
   wherein the shell is dome-shaped.

5. A device in fluid communication with a feeder head cavity for use in the supplying of melt into a connected casting mold, the device comprising:
   (a) a substantially fluid impervious shell having, in a selected position, an open bottom to permit entry of melt;
   (b) a refractory inner lining in at least a portion of the shell adapted to be at times in thermal contact with the melt;
   (c) a temperature-responsive fluid pressure-producing agent contained by the refractory; and
   (d) a chill seal means around the open bottom of the shell adapted to be at times in sealing contact with the melt for providing a gas impervious seal between the shell and the melt;
   wherein fluid pressure is generated by heat transfer to the agent, and the pressure is directed toward the supplying of melt toward the casting mold.

6. A device according to claim 5
   wherein a fluid conducting shaft extends from the refactory into the feeder head cavity.

7. A device according to claim 6
   wherein the shaft is a porous rod.

8. A device according to claim 6
   wherein the shaft is a tube.

9. A device according to claim 5
   wherein the refractory and said agent comprises green sand.

10. A device according to claim 5
    wherein said agent is a liquid.

11. A device according to claim 10
    wherein said agent comprises water.

12. A device according to claim 10
    wherein said agent is a liquid which produces a gas.

13. A device according to claim 10
    wherein said agent is a liquid which expands upon the transfer of heat thereto but which produces no substantial quantity of gas.

14. A device according to claim 5 wherein said agent is a metal which is vaporizable at a temperature below the melt temperature.

15. A device according to claim 5 wherein said agent is interposed between the refractory and the shell.

16. A device according to claim 5 wherein said agent is distributed within at least a portion of the body of the refractory.

17. A device according to claim 5 wherein the refractory lines the whole shell and said agent is essentially water distributed throughout the refractory.

18. A device according to claim 5 wherein said agent comprises at least one substance which undergoes a phase change.

19. A device according to claim 5 wherein the shell is dome-shaped, the refractory is green sand, and the agent is essentially the water of the green sand.

20. A device according to claim 19 wherein the shell has a vent therein to allow the escape of air from the feeder head cavity during the entrance of melt therein.

21. In a casting structure of the type having a feeder head cavity formed by green sand, having a fluid conducting shaft extending from within the green sand into the feeder head cavity, the improvement which comprises a substantially fluid impervious shell surrounding at least the top portion of the cavity and chill seal means for providing a fluid impervious seal between the casting melt and the shell.

22. In an improved device forming a feeder head cavity of the type for applying superatmospheric pressure to a melt within the cavity by the conduction of heat from a melt to a gas pressure-producing agent, and producing gas thereby, the improvement which comprises
a gas producing agent positioned entirely outside of the feeder head cavity but in thermal connection to the feeder head said agent being contained in a substantially fluid impervious shell surrounding at least a substantial portion of said cavity, said shell being provided with chill seal means for providing a fluid impervious seal between the melt and the shell, said shell having a refractory lining.

23. In a casting structure having a feeder head cavity of the type for applying superatmospheric pressure to a melt within said cavity, the improvement which comprises
(a) a temperature-responsive fluid pressure-producing agent;
(b) a substantially fluid impervious shell positioned to surround said agent in a manner to direct such pressure to said melt; and
(c) a chill seal means for providing a fluid impervious seal between the shell and the melt.

24. A device according to claim 6, wherein the shaft is compacted sand.

25. A device according to claim 24, wherein the shaft is conical.

26. A device according to claim 11, wherein the ratio of water to refractory is less than 1:10.

27. A device according to claim 26, wherein the ratio is less than 2:100.

28. A device for mounting in fluid communication with a feeder head cavity and for containing pressure from a temperature-responsive fluid pressure-producing agent and used in the supplying of melt to a casting mold, said device comprising:
a substantially fluid impervious shell having, in a selected position, an open bottom to permit entry of melt into the cavity, said shell having a refractory inner lining containing said agent and the shell having a fluid conducting shaft extending from within the shell for extending into the cavity.

References Cited

UNITED STATES PATENTS

| 1,533,474 | 4/1925 | Shotton | 164—119 X |
| 2,568,428 | 9/1951 | Billiar | 164—360 X |
| 2,745,154 | 5/1956 | Lucien et al. | 164—359 |
| 1,313,602 | 8/1919 | Luxmore | 164—119 X |

FOREIGN PATENTS

| 296,944 | 5/1965 | Netherlands. |

ROBERT D. BALDWIN, Primary Examiner

U.S. Cl. X.R.

164—360, 410